UNITED STATES PATENT OFFICE.

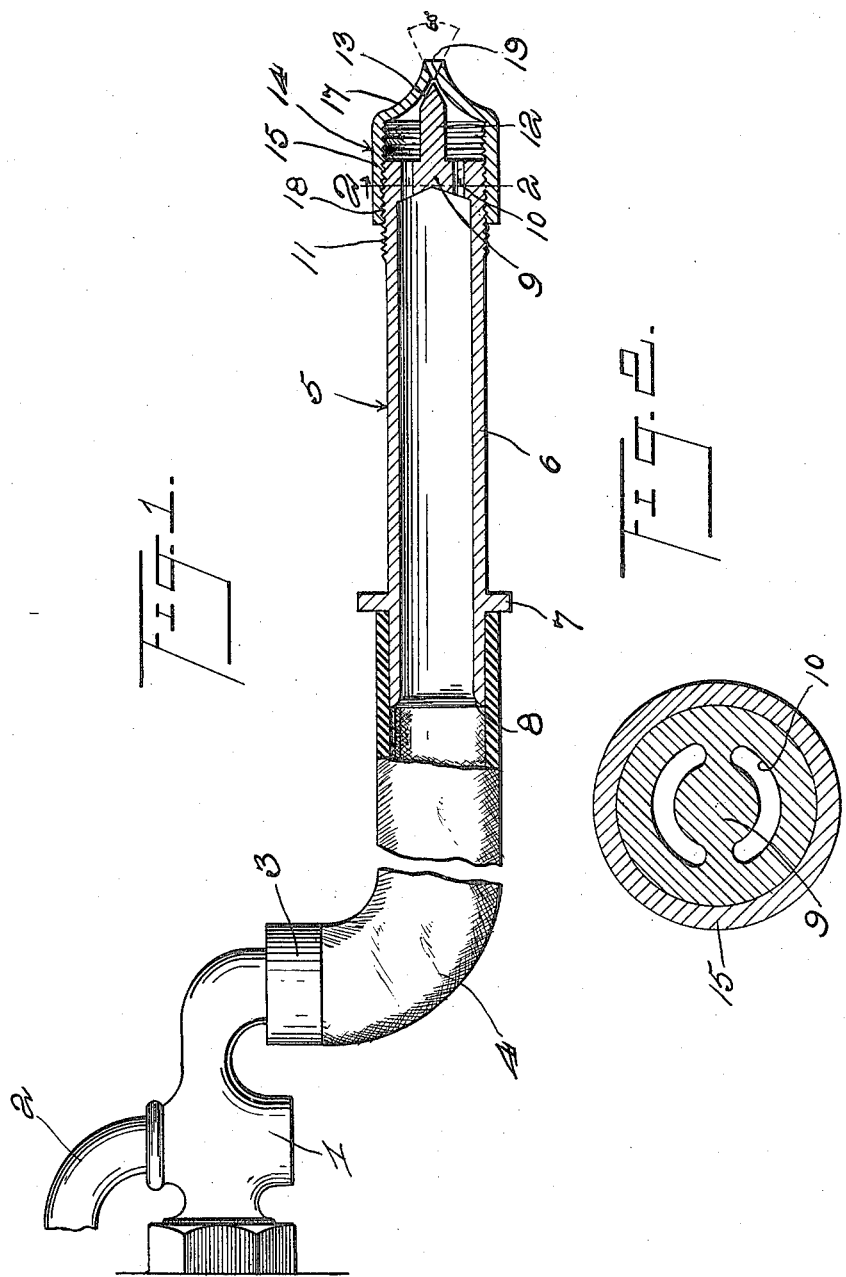

CHARLES KRUSOFT, OF DETROIT, MICHIGAN.

CLOTHES-SPRAY.

1,158,241.  Specification of Letters Patent.  Patented Oct. 26, 1915.

Application filed October 28, 1914. Serial No. 869,103.

*To all whom it may concern:*

Be it known that I, CHARLES KRUSOFT, Austrian subject, residing at Detroit, in the county of Wayne and State of Michigan, have invented certain new and useful Improvements in Clothes-Sprays; and I do hereby declare the following to be a full, clear, and exact description of the invention, such as will enable others skilled in the art to which it appertains to make and use the same.

This invention relates to new and useful improvements in clothes sprays, and has for its principal object to provide a device which is particularly adapted for use in sprinkling clothes preparatory to ironing the same.

Another object of the invention is to provide a device which may be easily and cheaply constructed and will effectively control the flow of liquid through the nozzle.

With these and other objects in view, the invention consists in the novel combination and arrangement of parts which will be fully set forth in the following specification and accompanying drawings, in which—

Figure 1 is a view partially in section of a device constructed in accordance with this invention, and Fig. 2 is a transverse sectional view taken on line 2—2 of Fig. 1.

Referring now to the drawings by characters of reference, the numeral 1 designates a faucet which is controlled by the use of a handle 2. Secured to the faucet is the sleeve 3 to which the rubber hose, designated by the numeral 4, is arranged to be connected. This hose is arranged to receive at its free end the nozzle which is designated generally by the numeral 5 and which will be more fully hereinafter described. This nozzle comprises the tubular body 6 having formed near one end the annular flange 7. The end of the body 6 beyond the flange is beveled inwardly as at 8 to provide for a free passage of liquid therethrough so as to reduce the friction to a minimum. The end of the body 6 opposite the end which is cut away as at 8 is formed with the closure 9, which closure is provided with the arcuate aperture 10 through which the liquid is arranged to pass. A plurality of screw threads 11 are formed on the closed end of the tubular body 6 and these threads are arranged to hold the cap, which will be more fully hereinafter described, in place. A longitudinal extension 12 is formed centrally of the closure 9 and projects beyond the end thereof and terminates in the conical portion 13, the sides of which are preferably on an angle of approximately sixty degrees.

The cap hereinbefore referred to, is designated generally by the numeral 14 and comprises the cylindrical body 15 which terminates in the tapered portion 17. This body is internally screw threaded as at 18 and the threads therein are arranged to coöperate with the threads 11 hereinbefore mentioned in holding the cap in place. The tapered portion 17 is arranged so that it forms a seat for the conical member 13 and this tapered portion is provided with the central flared aperture 19, the walls of which are approximately at a fifty-degree angle. This aperture flares outwardly as clearly shown in Fig. 1 and is arranged to direct the liquid passing therethrough outwardly in the form of a spray to dampen the clothes which are to be ironed.

It will be apparent from the foregoing that in use the device is connected to a suitable source of water supply by means of the rubber hose 4 and upon turning on the flow of water, it will be evident that the same will pass through the tubular body 6 and out through the aperture 10 into the chamber formed in the cap 14. The liquid will then be directed through the reduced aperture 19 and sprayed from the broad end thereof and over the articles which are to be dampened. Should it be desired to control the flow of the liquid the cap may be turned so as to bring the part 13 closer or farther away from the opening 19 and it will be clearly apparent that the passage of liquid through the aperture may be increased or decreased at the desire of the user.

While in the foregoing there has been shown and described the preferred embodiment of this invention, it is to be understood that such changes may be made in the combination and arrangement of parts as will fall within the spirit and scope of the invention as defined in the appended claim.

What is claimed is:

A clothes spray comprising a hollow cylindrical body, a flange formed around said body adjacent one end, the opposite end being screwthreaded, a closure plate formed at the screwthreaded end of said body, said closure plate being provided with arcuate apertures therein, and a stem formed centrally and disposed between the apertures and extending outwardly from the front face of said plate, a cap interiorly screwthreaded and having its front end tapered to conform to the end of the stem and movably secured to the screwthreaded end of the body, the tapered portion being provided with a central aperture arranged to coöperate with and receive the end of the stem to control the flow of liquid through the body.

In testimony whereof I affix my signature in presence of two witnesses.

CHARLES KRUSOFT.

Witnesses:
PETER JANIK,
SANTY JAKOYOS.